UNITED STATES PATENT OFFICE.

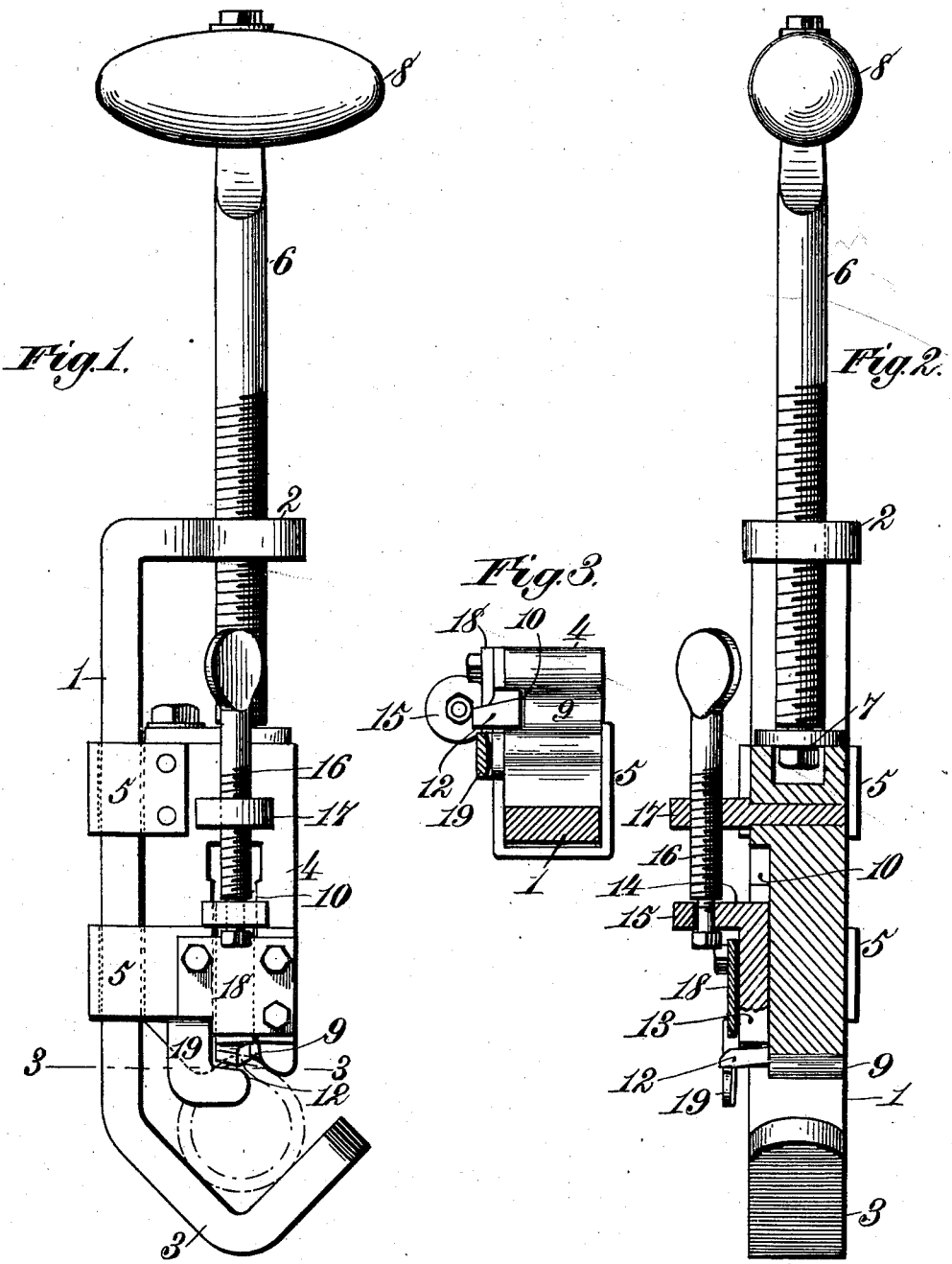

GEORGE THOMAS, OF KUTTAWA, KENTUCKY, ASSIGNOR OF ONE-HALF TO WILLIAM ELLIS PEAY, OF SAME PLACE.

PIPE TRIMMING AND TAPERING TOOL.

SPECIFICATION forming part of Letters Patent No. 669,866, dated March 12, 1901.

Application filed May 25, 1900. Serial No. 17,987. (No model.)

*To all whom it may concern:*

Be it known that I, GEORGE THOMAS, a citizen of the United States, residing at Kuttawa, in the county of Lyon and State of Kentucky, have invented new and useful Improvements in Pipe Trimming and Tapering Tools, of which the following is a specification.

It is the purpose of my invention to provide a pipe trimming and tapering tool for the use of pipe-fitters, as well as all others who may have to use pipe-cutters of any kind.

It is my object to provide a pipe trimming and tapering tool which will remove or trim off the bur left by the pipe-cutter and by which any pipe that happens to be slightly in excess of the standard size may be accurately trimmed down to any degree required.

It is my object also to provide a tool which will taper the ends of pipes at any angle and to any degree required by the pipe-fitter and by which also the end of a pipe can be rounded to the best shape possible for obtaining a true and perfect thread.

Said invention also possesses novel and useful features, which will be fully explained in the following specification, together with those hereinafter referred to, and then particularly pointed out and defined in the claims.

For the purposes of the following description reference is had to the accompanying drawings, in which—

Figure 1 is a side elevation of a pipe trimming and tapering tool in which my invention is incorporated. Fig. 2 is a front elevation of the same, part of the cutter-head being in section to show the construction of the tapering-tool and its connection to the adjusting-screw. Fig. 3 is a section upon the line 3 3 in Fig. 1 to show the shearing position of the trimming or tapering tool and the position of the stop in relation to said tool.

The reference-numeral 1 in said drawings indicates the frame of the tool, which consists of a straight back terminating at one end in a lug or bracket 2, which stands at a right angle to the back, and at the other end in a V-shaped head 3, which projects on the frame side of the lug 2. This frame resembles that used in pipe-cutters, and it has a similar function, as it serves to support and guide a cutter-head 4, which is connected with the frame by loops 5 5, which embrace and slide upon the straight back of the frame, their ends being secured to the cutter-head. The latter is adjusted upon the frame by a screw-threaded bar 6, which passes through a threaded opening in the lug or bracket 2, its end being connected to the cutter-head by a swiveled or other suitable joint at 7. The other end of said bar is provided with a cross-head lever 8 or other suitable means whereby it can be turned to move the cutter-head in either direction.

The end of the cutter-head nearest the head 3 of the frame is provided with a recess 9 for the pipe, and upon one side of the cutter-head in a channel 10 is a tool 12, the edge of which forms a small angle with the axis of the pipe, so that it may have a shearing cut. The shank 13 of said tool, which is parallel to the back of the frame 1, extends downward in the channel 10, its lower end having a lug 14, which projects out of the channel and has at its end a collar 15. An adjusting-screw 16, passing through a threaded lug 17 below the end of the channel 10, has its end swiveled or otherwise connected to this collar 15, so that by turning the screw in either direction the tool 12 can be adjusted toward or from the pipe, which is clamped between the V-shaped head 3 and the recessed end of the cutter-head. The channel 10 is covered by a strong plate 18 for retaining the shank 13 of the tool 12 within the channel 10 and from which a guard or stop 19 projects, its edge lying near the back of the tool. The wide flat face of this stop lies against the end of the pipe to prevent the latter from displacement or "crawling" due to the shearing action of the tool.

I do not herein restrict myself to the form, proportions, and minor details of construction shown in the drawings and set forth in the specification, as variations therein may be made within the scope of my invention as defined in the appended clauses of the claim without departing from the spirit or sacrificing any of the advantages of the invention.

Having thus described my invention, what I claim as new, and desire to secure by Letters Patent of the United States, is—

1. A pipe trimming and tapering tool, consisting of a frame having a head, a cutter-head carried by said frame, means connected to said head for adjusting the same, a suitable tool suitably connected to said head, means carried by said head and adapted to adjust the tool, independent of the adjusting means for the head, and a guard or stop, to prevent the pipe crawling under the action of the tool, substantially as described.

2. In a pipe trimming and tapering tool, the combination with a frame of a cutter-head movable toward and from a head on the frame, a tool adjustable in a channel in one side of the cutter-head, a guard, or stop, having its edge behind the tool and presenting its flat face to the ends of the pipe, and means for adjusting the cutter-head on the frame and the tool in its channel in the cutter-head, substantially as described.

3. In a pipe trimming and tapering tool, the combination with a frame, of a cutter-head movable on the back of said frame toward and from a V-shaped head at one end, a threaded bar in a lug on the other end of the frame to move said cutter-head, a tool lying in a dovetailed channel in one side of the cutter-head, and having a shank provided at its end with a lug projecting out of the channel and having a ring, a screw in a bracket on the cutter-head, its end engaging said ring to adjust the tool, and a guard, or stop, behind said tool to prevent the pipe from crawling under its shearing action, substantially as described.

4. In a pipe trimming and tapering tool, a cutter-head, means for adjusting the same, a tool carried by said cutter-head, means for adjusting said tool independent of the means for adjusting the cutter-head, and a guard arranged in coöperative relation to said tool to prevent a pipe from crawling under the action of the tool.

In testimony whereof I have hereunto set my hand in presence of two subscribing witnesses.

GEORGE THOMAS.

Witnesses:
J. F. BYARD,
W. H. CARTER.